(12) United States Patent
Wu et al.

(10) Patent No.: US 7,523,901 B2
(45) Date of Patent: Apr. 28, 2009

(54) DRIVE BRACKET ASSEMBLY FOR CARRYING DATA STORAGE DEVICES

(75) Inventors: Chia-Kang Wu, Taipei Hsien (TW); Li-Ping Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 108 days.

(21) Appl. No.: 11/565,656

(22) Filed: Dec. 1, 2006

(65) Prior Publication Data

US 2008/0128578 A1 Jun. 5, 2008

(51) Int. Cl.
- *A47B 96/00* (2006.01)
- *A47K 1/00* (2006.01)
- *A47K 5/00* (2006.01)
- *E04G 5/06* (2006.01)
- *F16L 3/08* (2006.01)
- *F21V 21/00* (2006.01)
- *F21V 35/00* (2006.01)

(52) U.S. Cl. .......... 248/225.21; 248/27.1; 248/27.3; 248/250; 211/26; 211/72; 211/84; 211/162; 361/679; 361/683; 361/685; 361/724; 312/223.1; 312/223.2; 312/333; 369/75.11

(58) Field of Classification Search .......... 248/27.1, 248/27.3, 250, 225.21, 247; 211/26, 72, 211/84, 162; 361/679, 683, 685, 724; 312/223.1, 312/223.2, 333; 369/75.11–82

See application file for complete search history.

(56) References Cited

U.S. PATENT DOCUMENTS

| | | | | |
|---|---|---|---|---|
| 3,782,800 | A * | 1/1974 | Remington et al. | 312/333 |
| 4,979,909 | A * | 12/1990 | Andrews | 439/352 |
| 6,122,173 | A * | 9/2000 | Felcman et al. | 361/726 |
| 6,256,195 | B1 * | 7/2001 | Liao | 361/685 |
| 6,257,682 | B1 * | 7/2001 | Liu et al. | 312/223.2 |
| 6,293,636 | B1 * | 9/2001 | Le et al. | 312/223.2 |
| 6,377,449 | B1 | 4/2002 | Liao et al. | |
| 6,392,874 | B1 * | 5/2002 | Gan | 361/683 |
| 6,407,912 | B1 * | 6/2002 | Chen et al. | 361/683 |
| 6,412,891 | B1 * | 7/2002 | Liang et al. | 312/334.44 |
| 6,422,399 | B1 * | 7/2002 | Castillo et al. | 211/26 |
| 6,464,085 | B1 * | 10/2002 | Chin et al. | 211/26 |
| 6,590,848 | B1 * | 7/2003 | Chen | 720/654 |
| 6,646,871 | B1 * | 11/2003 | Liao et al. | 361/685 |

(Continued)

*Primary Examiner*—J. Allen Shriver, II
*Assistant Examiner*—Michael McDuffie
(74) *Attorney, Agent, or Firm*—Wei Te Chung

(57) ABSTRACT

A drive bracket assembly for carrying data storage devices, includes a first carrying bracket having a pair of side walls, a second carrying bracket mounted in the first carrying bracket, and a locking latch. The second carrying bracket includes a pair of side walls. A securing member including a first blocking tab formed on each side wall of the second carrying bracket. A locking latch is resiliently and moveably attached to one of the side walls of the first carrying bracket. A blocking member corresponding to the first blocking tab of the securing member is formed on the locking latch, for preventing a movement of the second carrying bracket along a first direction parallel to the side walls of the first carrying bracket. The first carrying bracket can be mounted in the first carrying bracket for carrying small type data storage devices. The second carrying bracket can be removed from the first carrying bracket so that the first carrying bracket can hold more large type data storage devices.

20 Claims, 6 Drawing Sheets

U.S. PATENT DOCUMENTS

| | | | |
|---|---|---|---|
| 6,744,626 B2 * | 6/2004 | Chen et al. | 361/685 |
| 6,757,164 B2 * | 6/2004 | Lin | 361/685 |
| 6,773,080 B2 * | 8/2004 | Chen et al. | 312/265.1 |
| 6,813,148 B2 * | 11/2004 | Hsu et al. | 361/685 |
| 6,853,549 B2 * | 2/2005 | Xu | 361/685 |
| 6,870,731 B2 * | 3/2005 | Lin et al. | 361/683 |
| 6,930,247 B2 * | 8/2005 | Chen et al. | 174/50 |
| 6,948,691 B2 * | 9/2005 | Brock et al. | 248/222.13 |
| 6,997,527 B2 * | 2/2006 | Cheng | 312/332.1 |
| 7,031,150 B2 * | 4/2006 | Chen et al. | 361/685 |
| 7,035,099 B2 * | 4/2006 | Wu | 361/685 |
| 7,061,755 B2 * | 6/2006 | Lin et al. | 361/683 |
| 7,102,885 B2 * | 9/2006 | Chen et al. | 361/685 |
| 7,190,574 B2 * | 3/2007 | Muenzer et al. | 361/685 |
| 7,200,003 B2 * | 4/2007 | Hood et al. | 361/685 |
| 7,218,508 B2 * | 5/2007 | Chen et al. | 361/679 |
| 2002/0158556 A1 * | 10/2002 | Cheng | 312/333 |
| 2004/0173544 A1 * | 9/2004 | Chen | 211/26 |
| 2005/0088813 A1 * | 4/2005 | Chen et al. | 361/683 |
| 2005/0195564 A1 * | 9/2005 | Peng et al. | 361/685 |
| 2005/0237706 A1 * | 10/2005 | Li et al. | 361/683 |
| 2006/0034048 A1 * | 2/2006 | Xu | 361/685 |
| 2006/0209501 A1 * | 9/2006 | Han | 361/679 |
| 2007/0058333 A1 * | 3/2007 | Kim | 361/683 |
| 2007/0139869 A1 * | 6/2007 | Chen et al. | 361/679 |

* cited by examiner

DRIVE BRACKET ASSEMBLY FOR CARRYING DATA STORAGE DEVICES

BACKGROUND OF THE INVENTION

1. Field of the Invention

The present invention relates to bracket assemblies, and more particularly to a drive bracket assembly for carrying different types of data storage devices.

2. Description of Related Art

Typically, drive brackets are generally used for accommodating and securing data storage devices, such as hard disk drives (HDDs), floppy disk drives (FDDs), compact disk read only memory (CD-ROM) drives, etc., in a personal computer or a server enclosure. Conventionally, different types of data storage devices are received in different types of drive brackets first. Then, the different types of drive brackets are together mounted in the computer or server enclosure. In another conventional embodiments, different types of data storage devices are accommodated in a ladder bracket. In actual use, a plurality of data storage devices is needed to be mounted in a server enclosure. Because of different demands regarding the types of data storage devices, different types of drive brackets may be mounted in an enclosure, however, users may need only one type of data storage device. If many different types of drive brackets are mounted in the enclosure, the drive brackets not needed, will wastefully occupy internal space of the enclosure. However, if only one type of drive bracket is mounted in the server enclosure, the conventional drive bracket cannot fit the demand when users need to use another different type of data storage device.

Accordingly, what is needed is a drive bracket assembly for carrying different types of data storage devices and allowing easy replacement of data storage devices with other types of data storage devices.

SUMMARY OF THE INVENTION

A drive bracket assembly for carrying data storage devices, includes a first carrying bracket having a pair of side walls, a second carrying bracket mounted in the first carrying bracket, and a locking latch. The second carrying bracket includes a pair of side walls. A securing member including a first blocking tab formed on each side wall of the second carrying bracket. A locking latch is resiliently and moveably attached to one of the side walls of the first carrying bracket. A blocking member corresponding to the first blocking tab of the securing member is formed on the locking latch, for preventing a movement of the second carrying bracket along a first direction parallel to the side walls of the first carrying bracket.

Other advantages and novel features of the present invention will be drawn from the following detailed description of preferred embodiment with attached drawings, in which:

DETAILED DESCRIPTION OF THE INVENTION

Figure 1:
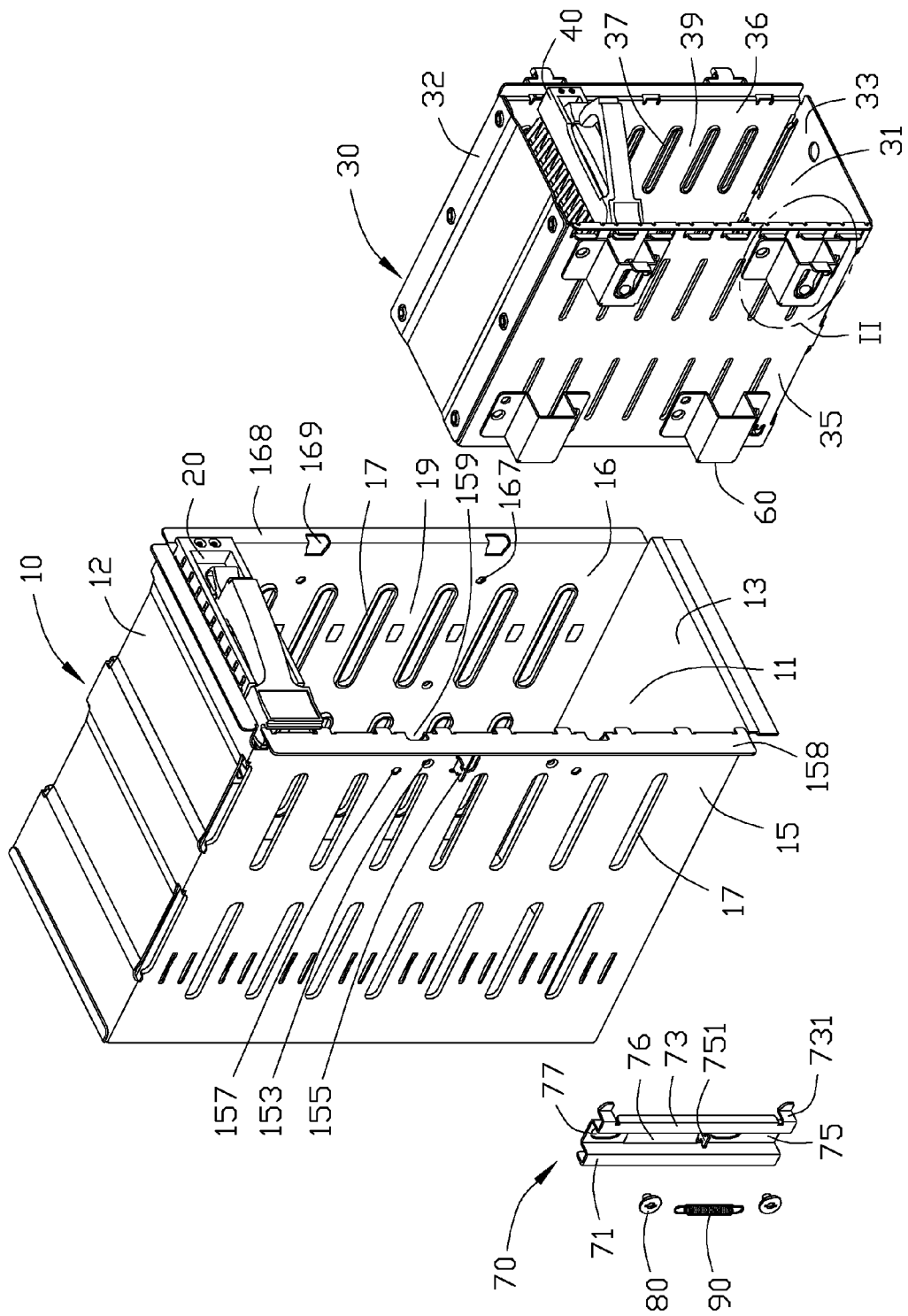
FIG. 1 is an exploded, isometric view of a preferred embodiment of a drive bracket assembly for carrying data storage devices, including a first carrying bracket, a second carrying bracket, and a locking latch.
Figure 2:
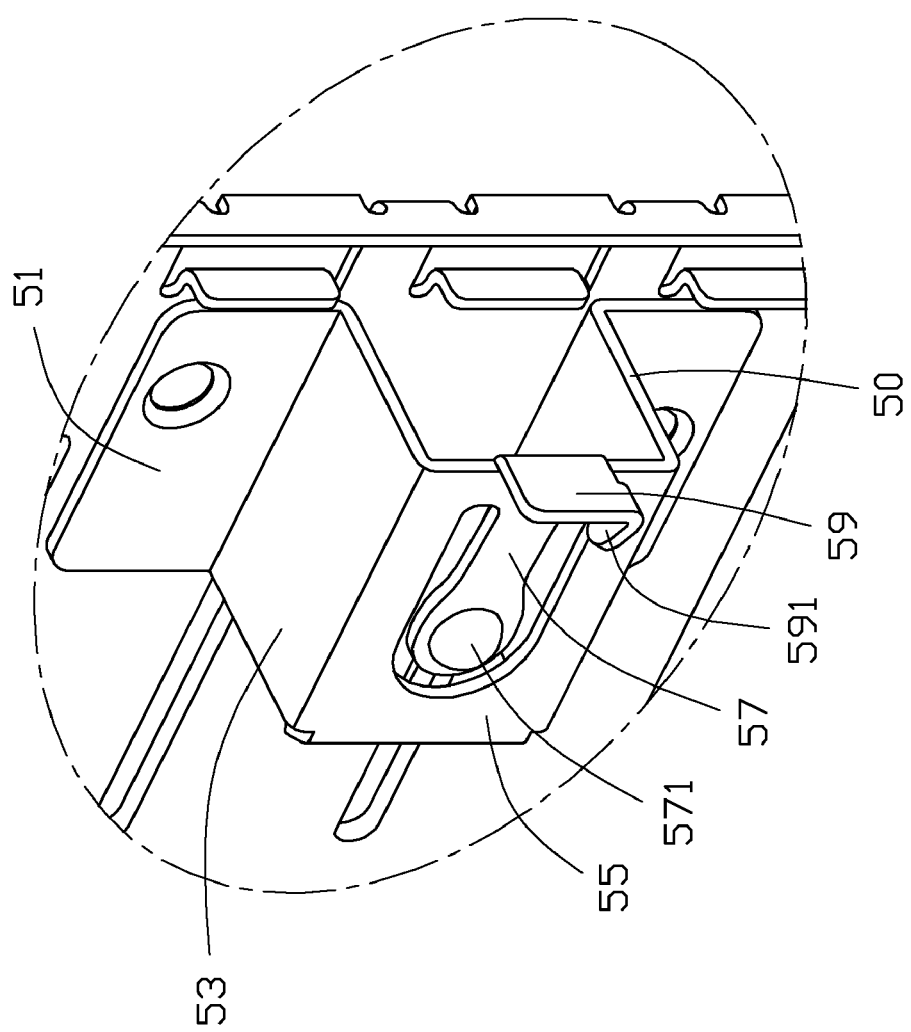
FIG. 2 is an enlarged view of part 11 in FIG. 1.

Referring to FIGS. 1 and 2, a drive bracket assembly for carrying data storage devices includes a first carrying bracket 10, a second carrying bracket 30, and a locking latch 70. The second carrying bracket 30 is mounted in the first carrying bracket 10 so as to form a drive bracket assembly.

The first carrying bracket 10 includes a top wall 12, a bottom wall 13, and a pair of opposite side walls 15, 16 respectively perpendicular to the top wall 12 and the bottom wall 13. The top wall 12, bottom wall 13, and the pair of side walls 15, 16 cooperate to define an opening 11. Two rows of ellipse-shaped slots are defined in each side wall in parallel. A supporting flange 17 extends in from the edge of each slot. Each two adjacent supporting flanges 17 arranged in each row define a guiding channel 19. Each guiding channel 19 in the side wall 15 is parallel to a corresponding opposite guiding channel 19 in the side wall 16. A plurality of large type data storage devices 20 can be mounted in the first carrying bracket 10 respectively along the guiding channels 19 and supported on the supporting flanges 17. A pair of securing holes 153 is defined in one side of the side wall 15 adjacent to the opening 11. A hook 155 protrudes from the side wall 15 between the pair of securing holes 153. A pair of positing holes 157 is respectively defined in the side wall 15 adjacent to the pair of securing holes 153. A pair of positing holes 167 is defined in the side wall 16 corresponding to the positing holes 157. Flanges 158/168 respectively extend out from edges of the side walls 15/16. Slots 159/169 are respectively defined at joints of the side walls 15/16 and the flanges 158/168.

The second carrying bracket 30 includes a top wall 32, a bottom wall 33, and a pair of side walls 35, 36 perpendicular to the top wall 32 and the bottom wall 33. The top wall 32, bottom wall 33, and the pair of side walls 35, 36 are connected together to define an opening 31. Two rows of ellipse-shaped slots are defined in each side wall in parallel. A supporting flange 37 extends in from the edge of each slot. Each two adjacent supporting flanges 17 arranged in each row define a guiding channel 39. Each guiding channel 39 in the side wall 35 is parallel to a corresponding opposite guiding channel 39 in the side wall 36. A plurality of small type data storage devices 40 can be mounted in the second carrying bracket 30 respectively along the guiding channels 39 and supported on the supporting flanges 37. A securing member 50 is mounted on one end of the outer side of each of the side walls 35/36 (shown in FIG. 2). Each securing member 50 includes a pair of wings 51 riveted to the corresponding side walls 15/16. A pair of opposite side walls 53 perpendicular to the wings 51 respectively extends from edges thereof. A securing wall 55 is connected between the side walls 53, and the width of the securing wall 55 is substantially equal to that of the guiding channel 19 of the first carrying bracket 10. An elastic positing member 57 is formed on the securing wall 55. A positing protrusion 571 is formed at a distal end of the positing member 57. A first blocking tab 59 vertically extends from an edge of the securing wall 55 of each securing member 50. A second blocking tab 591 extends from one end of the first blocking tab 59. A gap is defined between the second blocking tab 591 and the securing wall 55 of each securing member 50. A pair of sliding members 60 is respectively mounted on the other end of each of the side walls 35/36. Shapes of the sliding members 60 are substantially same as the securing members 50. In assembling the second carrying bracket 30 to the first carrying bracket 10, the securing members 50 and the sliding members 60 slide into the first carrying bracket 10 along the guiding channels 19 and are supported on the supporting flanges 17.

The locking latch 70 includes a pair of U-shaped folded wings 71, 73 and a connecting wall 75 connected therebetween. A pair of blocking members 731 corresponding to the first blocking tabs 59 is respectively formed at two ends of the wing 71. A pair of spaced ellipse-shaped guiding slots 77 is defined in the connecting wall 75. A narrow slot 76 is defined between the pair of guiding slots 77, for allowing the hook 155 of the first carrying bracket 10 to be exposed therefrom. A hook 751 protrudes from a lower edge of the slot 76 and is perpendicular to the connecting wall 75.

In assembly, a pair of limiting members 80 pass through the guiding slots 77 of the locking latch 70 and the corresponding securing holes 153 in the first carrying bracket 10, to mount the locking latch 70 to the side wall 15 of the first carrying bracket 10. The locking latch 70 can move along the side wall 15 relative to the limiting members 80. A spring 90 is connected between the hook 155 on the first carrying bracket and the hook 751 on the locking latch 70. In an initial state, the spring 90 is strained. The locking latch 70 is posited in a first position due to the tension of the spring 90. At this time, the limiting members 80 are engaged with bottoms of the guiding slots 77. The blocking members 731 of the locking latch 70 respectively cover a corresponding part of each of the slots 159, 169.

Figure 3:
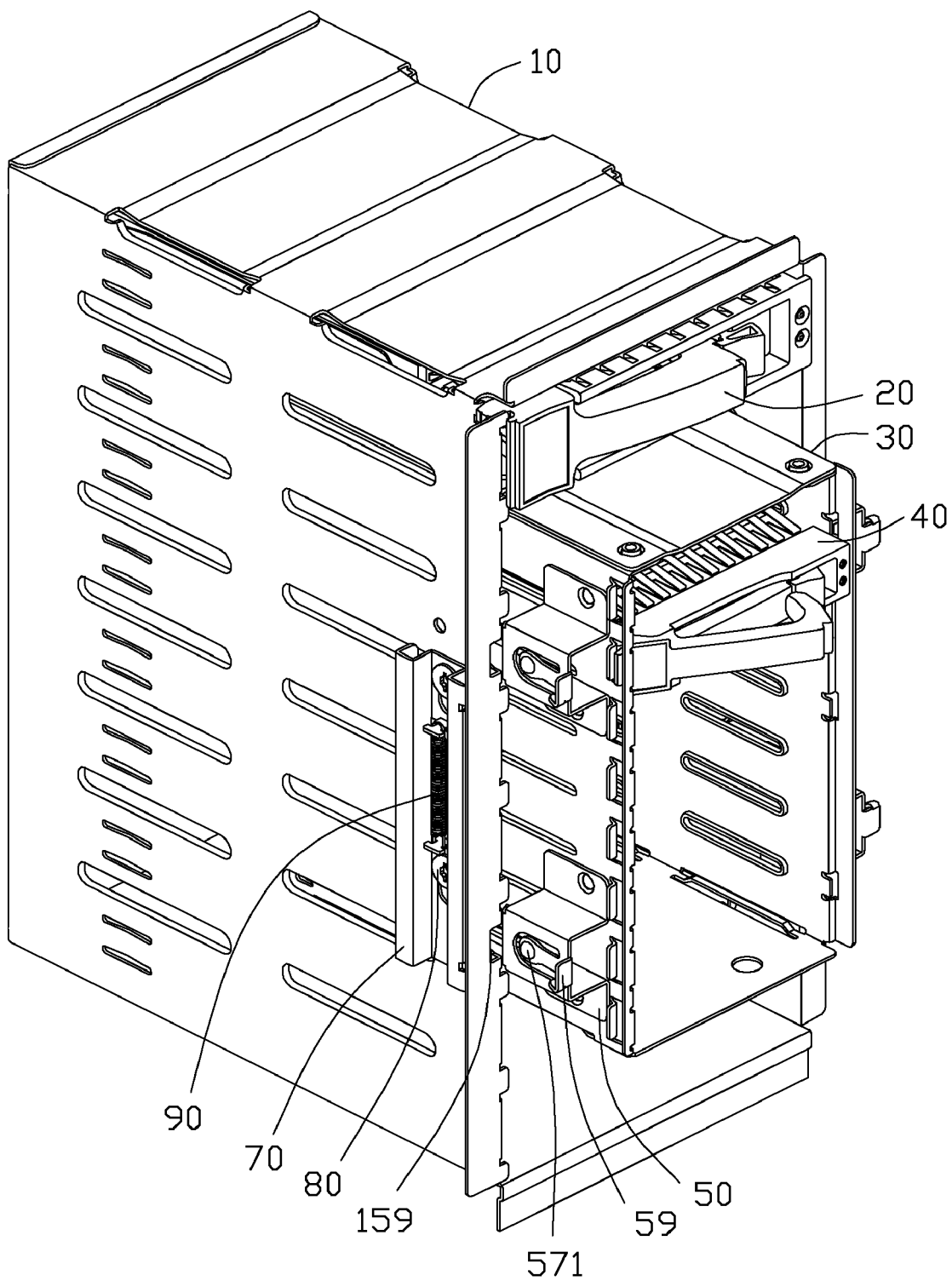
FIG. 3 is an assembled view of the drive bracket assembly in FIG. 1, showing the second bracket detached from the first bracket.
Figure 4:
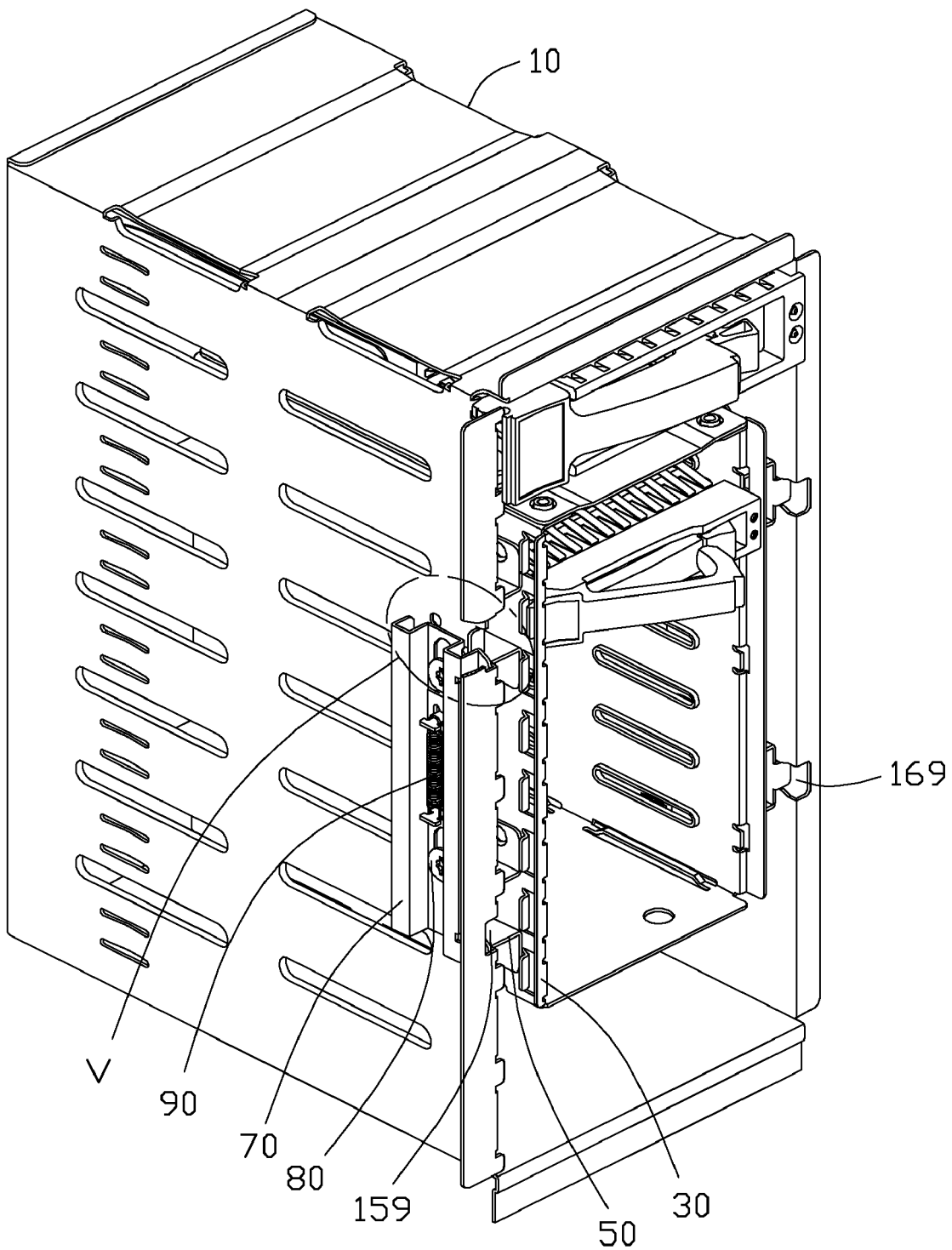
FIG. 4 is an assembled view of the drive bracket assembly in FIG. 1 with part of the first carrying bracket being removed.
Figure 5:
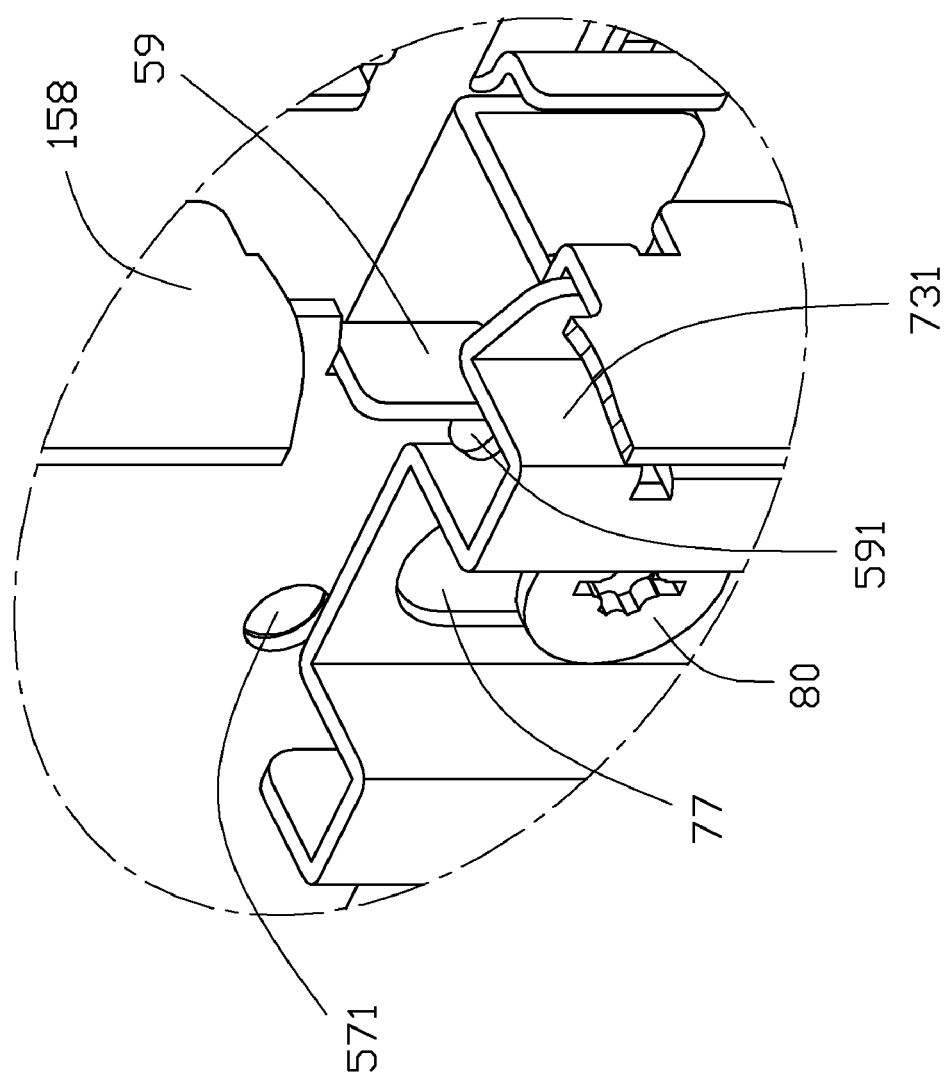
FIG. 5 is an enlarged view of part V in FIG. 4.
Figure 6:
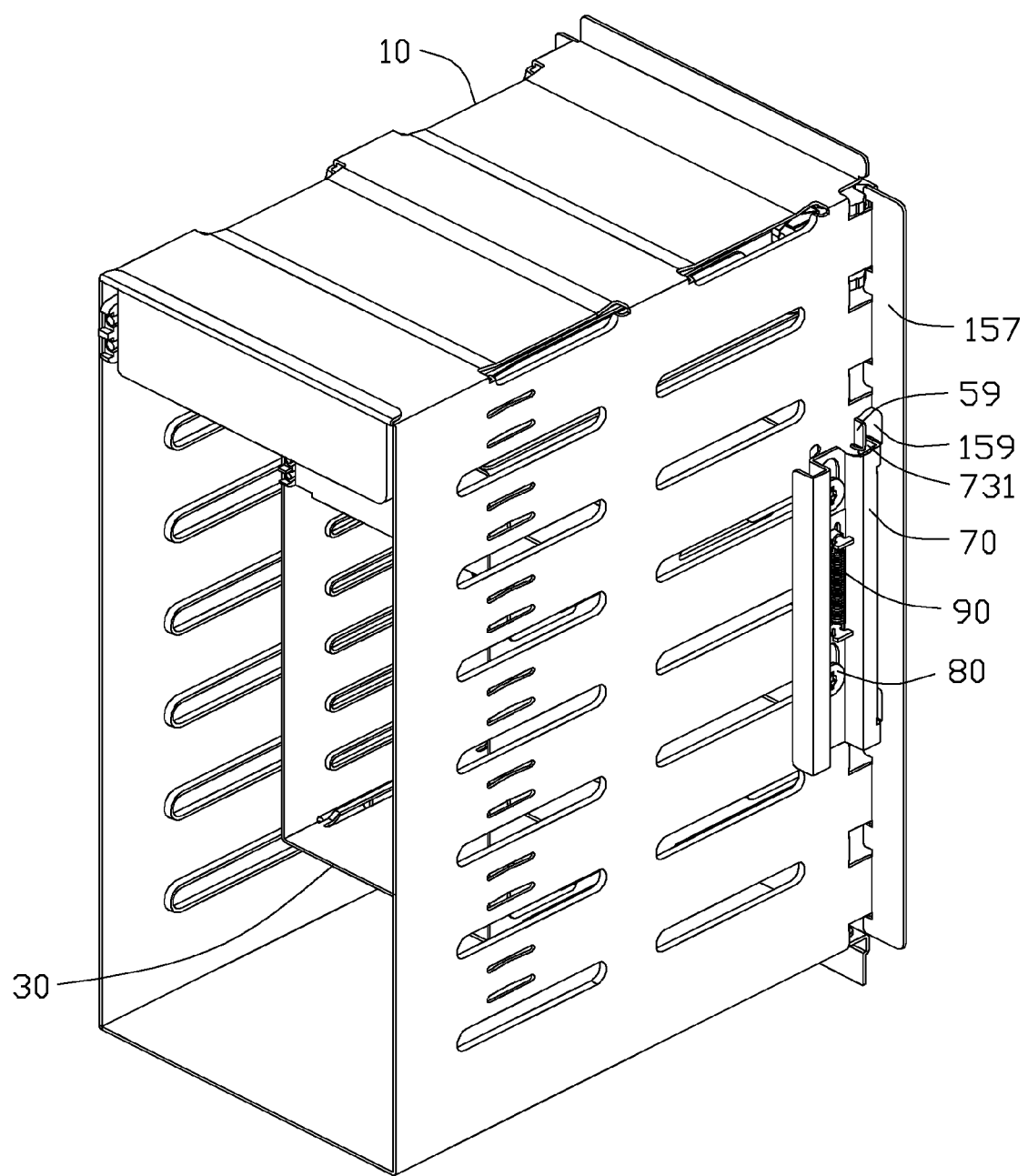
FIG. 6 is an assembled view of the drive bracket assembly in FIG. 1 with part of the locking latch being removed, but viewed from another aspect.

Referring also to FIG. 3 to FIG. 6, when installing the second carrying bracket 30 in the first carrying bracket 10, the locking latch 70 is pushed down to a second position, as shown in FIG. 3. The spring 90 is further strained. The blocking members 731 move down, and the slots 159, 169 are all exposed. Then the second carrying bracket 30 is pushed into the first carrying bracket 10 from the opening 11, with the sliding members 60 aligning with two pairs of the guiding channels 19 of the first carrying bracket 10. The first and second blocking tabs 59, 591 slide in the slots 159, 169. The first blocking tabs 59 abut against the edges of the side walls 15, 16 at the slots 159, 169. The edges of the side walls 15, 16 at the slots 159, 169 are respectively received in the gaps between the second blocking tabs 591 and the securing walls 55 of the securing members 50. The securing walls 55 of the securing members 50 respectively abut against inner sides of the side walls 15, 16 of the first carrying bracket 10. The positing protrusions 571 of the securing members 50 engage in the positing holes 157, 167. Then, the locking latch 70 is released, the spring 90 rebounds to the initial state. The locking latch 70 moves back to the first position under the drive of the spring 90, as shown in FIG. 4. The blocking members 731 of the locking latch 70 abut against the first blocking tabs 59 and cover portions of the slots 159, 169 again, as shown in FIG. 5, for preventing the second carrying bracket 30 from withdrawing from the first carrying bracket 10 along a first direction parallel to the side walls 15, 16. The edges of the side walls 15, 16 are sandwiched between the second blocking tabs 591 and the securing walls 55 of the securing members 50, for limiting a movement of the second carrying bracket 30 along a second direction perpendicular to the first direction. Thus, the second carrying bracket 30 is mounted in the first carrying bracket 10 forming a carrying drive bracket assembly.

In disassembly, the locking latch 70 is pushed down, the blocking members 731 leave the slots 159, 169 and the first blocking tabs 59, and the second carrying bracket 30 is pulled from the first carrying bracket 10. Thus, the second carrying bracket 30 is detached from the first carrying bracket 10.

In use, the second carrying bracket 30 can be removed from the first carrying bracket 10 when not needed so that the first carrying bracket 10 can be used for carrying more large type data storage devices 20. When it is needed to use small type data storage devices 40, the first carrying bracket 30 can be mounted in the first carrying bracket 10 for holding the small type data storage devices 40 therein.

It is to be understood, however, that even though numerous characteristics and advantages have been set forth in the foregoing description of preferred embodiments, together with details of the structure and function, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A drive bracket assembly for carrying data storage devices, comprising:
   a first carrying bracket having a pair of side walls;
   a second carrying bracket having a pair of side walls mounted in the first carrying bracket, at least one securing member comprising a first blocking tab provided on each side wall of the second carrying bracket; and
   a locking latch resiliently attached to one of the side walls of the first carrying bracket with a spring connected therebetween, the lacking latch comprising at least one blocking member engageable with the first blocking tab of the at least one securing member, for preventing the second carrying bracket withdrawing from the first carrying bracket along a first direction parallel to the side walls of the first carrying bracket, the locking latch slidable along the one of the side walls, for releasing the at least one blocking member from the first blocking tab of the at least one securing member.

2. The drive bracket assembly as described in claim 1, wherein a plurality of parallel supporting flanges arranged in a vertical row is formed on inside of each side wall of the first carrying bracket, each two adjacent supporting flanges in the vertical row define a guiding channel, the securing members of the second carrying bracket is slidable into the first carrying bracket along a pair of opposite guiding channels and are supported on the corresponding pair of supporting flanges.

3. The drive bracket assembly as described in claim 2, wherein the securing member is secured on one side of the second carrying bracket, and a sliding member is secured on the other side of each side wall of the second carrying bracket, the sliding member is slidable along one of the guiding channels and is supported on the supporting flanges.

4. The drive bracket assembly as described in claim 1, wherein each securing member comprises a securing wall abutting against one corresponding side wall of the first carrying bracket, an elastic positing member with a protrusion formed thereon is formed on the securing wall, a positing hole corresponding to the protrusion of each securing member is respectively defined in the corresponding side wall.

5. The drive bracket assembly as described is claim 4, wherein the first blocking tab of the securing member is perpendicularly formed from an edge of the securing wall of the securing member, a second blocking tab extends from an edge of the first blocking tab and cooperates with the securing wall to form therebetween a gap for receiving an edge of the side wall of the first carrying bracket for limiting a movement of the second carrying bracket along a second direction perpendicular to the side wall.

6. The drive bracket assembly as described in claim 1, wherein a pair of securing holes is defined in the one of the side walls of the first carrying bracket, a pair of guiding slots corresponding to the pair of securing holes is defined in the locking latch, a pair of limiting members respectively pass through the guiding slots and the securing holes for slidably attaching the locking latch to the first carrying bracket.

7. The drive bracket assembly as described in claim 6, wherein a hook perpendicularly protrudes from the one of the side walls between the pair of securing holes, another hook protrudes from the locking latch between the pair of guiding slots, the spring is connected between the hooks.

8. The drive bracket assembly as described in claim 7, wherein the locking latch comprises a pair of wings and a connecting wall between the wings, the guiding slots and the hook of the locking latch are formed in the connecting wall, the blocking member extends from a side of one of the wings.

9. The drive bracket assembly as described in claim 1, wherein a flange extends from each side wall of the first carrying bracket, and at least one slot is defined at a joint of the flange and the side wall, for the first blocking tab of the securing member extending therethrough and being blocked by the blocking member of the locking latch.

10. A drive bracket assembly for carrying a plurality of data storage devices, comprising:
a first carrying bracket having a pair of opposite side walls, the side walls cooperating to define an opening;
a second carrying bracket having a pair of side walls, the second carrying bracket mounted in the first carrying bracket along the opening, at least one first blocking tab formed on each side wall of the second carrying bracket; and
a locking latch attached to an outside of one side wall of the first carrying bracket, the locking latch slidable between a first position and a second position along the side wall of the first carrying bracket, a blocking member formed on the locking latch corresponding to the first blocking tab of the second carrying bracket, the blocking member abutting against the first blocking tab when the locking latch slides to the first position, for limiting a movement of the second carrying bracket along a first direction parallel to the side walls of the first carrying bracket.

11. The drive bracket assembly as described in claim 10, wherein at least one securing member is formed at each side wall of the second carrying bracket and is supported on the corresponding side wall of the first carrying bracket, the first blocking tab is formed on the securing member.

12. The drive bracket assembly as described in claim 11, wherein a plurality of parallel supporting flanges arranged in a vertical line is formed on each side wall of the first carrying bracket, each two adjacent supporting flanges in the vertical line define a guiding channel, the securing members of the second carrying bracket slide into the first carrying bracket along a pair of opposite guiding channels is the side walls and are supported on the corresponding pair of opposite supporting flanges.

13. The drive bracket assembly as described in claim 11, wherein each securing member comprises a securing wall abutting against an inside of one corresponding side wall of the first carrying bracket, an elastic positing member is formed on the securing wall, a positing hole corresponding to each elastic positing member is respectively defined in the corresponding side wall.

14. The drive bracket assembly as described in claim 13, wherein the first blocking tab of the securing member is vertically formed from an edge of the securing wall of the securing member, a second blocking tab vertically extends from an edge of the first blocking tab, for abutting against an outside of the side wall of the first carrying bracket to limit a movement of the second carrying bracket along a second direction perpendicular to the side walls of the first carrying bracket.

15. The drive bracket assembly as described in claim 14, wherein a flange extends from an edge of each side wall of the first carrying bracket, and at least one slot is defined at a joint of the flange and the side wall, for the first blocking tab of the securing member extending therethrough and being blocked by the blocking member of the locking latch.

16. The drive bracket assembly as described is claim 14, wherein a pair of securing holes is defined in the one of side walls of the first carrying bracket, a pair of guiding slots corresponding to the pair of securing holes is defined in the locking latch, a pair of limiting members respectively pass through the guiding slots and the securing holes for attaching the locking latch to the first carrying bracket.

17. The drive bracket assembly as described in claim 16, wherein a hook vertically protrudes from the side wall between the pair of securing holes, another hook protrudes from a locking lath between the pair of guiding slot, a spring is connected between the hooks.

18. A bracket assembly comprising:
a first bracket configured to hold larger data storage devices therein, the first drive bracket comprising a pair of first side walls defining a space therebetween for receiving the larger data storage devices, one of the first side walls defining a cutout;
a second bracket removably mounted within the space of the first drive bracket and configured to hold smaller data storage devices therein, the second drive bracket comprising a pair of second side walls one of which providing a securing member extending out through the cutout, the pair of second side walls integrally joined to each other to commonly define another space therebetween for receiving the smaller data storage devices; and
a locking latch attached to an outside of the one of the first side walls of die first carrying bracket and slidable with respect to the one of the first side walls between a first position at which the locking latch is locked with the securing member thereby retaining the second bracket within the first bracket and a second position at which the locking latch is unlocked with the securing member to allow the second bracket being removable from the first bracket.

19. The bracket assembly as described in claim 18, wherein a sliding structure is formed between each of the first side walls and a corresponding second side wall so that the second bracket is slidable into the first bracket in a front-and-back direction.

20. The bracket assembly as described in claim 19, wherein the locking latch defines an elongated through slot, a fastener extends through the elongated through slot to engage with the one of the first side walls so that the locking latch is slidably with respect to the first bracket between the fast and second positions in an up-and-down direction, a resilient member is connected between the locking latch and the one of the first side walls for urging the locking latch to the first position.

* * * * *